United States Patent [19]

White et al.

[11] Patent Number: 4,489,259
[45] Date of Patent: Dec. 18, 1984

[54] METHOD AND APPARATUS FOR CONTROLLING A STEPPER MOTOR

[75] Inventors: James N. J. White, Kinross; David S. Ruxton, Crieff; Alec D. Stewart, Fife, all of Scotland

[73] Assignee: Rodime Limited, Scotland

[21] Appl. No.: 373,281

[22] Filed: Apr. 29, 1982

[30] Foreign Application Priority Data

May 2, 1981 [GB] United Kingdom ............... 8113614

[51] Int. Cl.$^3$ ............................................. H02K 29/04
[52] U.S. Cl. .................................... 318/696; 318/185; 360/77
[58] Field of Search ..................... 360/77, 78; 318/696

[56] References Cited

U.S. PATENT DOCUMENTS

| | | | |
|---|---|---|---|
| 3,476,996 | 11/1969 | Fredriksen | 318/138 |
| 3,588,661 | 6/1971 | Newell | 318/691 |
| 3,694,725 | 9/1972 | Abraham et al. | 318/685 |
| 4,157,577 | 6/1979 | Porter et al. | 360/77 |

FOREIGN PATENT DOCUMENTS

| | | |
|---|---|---|
| 2430289 | of 0000 | Fed. Rep. of Germany . |
| 2721240 | of 0000 | Fed. Rep. of Germany . |
| 5610098 | of 0000 | Japan . |

Primary Examiner—S. J. Witkowski
Assistant Examiner—Saul M. Bergmann
Attorney, Agent, or Firm—Gerald J. Ferguson, Jr.; Joseph J. Baker

[57] ABSTRACT

A method and apparatus for controlling a stepper motor and a disk drive is described for minimization of stepper motor oscillations for a single step, minimizing the time taken for the stepper motor to move between tracks for multi-track seeks, and reduction of angular hysteresis due to the mechanical and magnetic properties of the stepper motor construction.

This control is achieved using a microprocessor-based circuit adapted to drive the stepper motor in accordance with predetermined programs. Oscillations of the stepper motor are damped by controlling, using one program, the current applied to the stepper motor during the last step of its motion by switching this current on and off within small predetermined time intervals. The time taken to move between tracks is controlled by another program in which the non-linear torque speed characteristics of a particular stepper motor are matched by a non-linear pulse rate which is determined by data held in the memory of the microprocessor circuit. This data can be modified to suit the requirements of the stepper motor and load. Another program controls minimization of hysteresis by ensuring that each track on the disk is approached from the same direction and from the same previously energized set of windings. The microprocessor controls the direction of motion of the stepper motor and hence decides whether or not the read/write head should cross the desired track and return it to ensure uniformity of approach.

22 Claims, 16 Drawing Figures $n-1 \rightarrow n$ DIRECT
$n+1 \rightarrow n$ INDIRECTLY AS $\quad n+1 \rightarrow n \rightarrow n-1 \rightarrow n$

METHOD AND APPARATUS FOR CONTROLLING A STEPPER MOTOR

BACKGROUND OF THE INVENTION

The present invention relates to a method and apparatus for controlling a stepper motor and particularly, but not exclusively, for use with a computer disk drive unit of the kind disclosed in British Patent Application No. 8041323.

The present invention is realised in a programmable circuit which is particularly, but not exclusively, suitable for open-loop control of stepper motors.

The contents of this patent relate to the use of a microprocessor-based system for the control of various stepper motors in a disk file, particularly; minimisation of stepper motor oscillations for a single step, acceleration and deceleration of the stepper motor for multi-track seeks; and reduction of angular hysteresis due to the mechanical/magnetic properties of the stepper motor construction.

As is known in the art, the stepper motor in a computer disk drive unit is used as the actuator for radially positioning the read/write head over the tracks on the disk surface. Detente positions of the stepper motor correspond to track positions on the disk. The stepper motor rotates by a predetermined amount in response to a winding or windings being energised. When windings are energised in succession this corresponds to the supply of pulses of current to the motor. The control of the rate of pulses applied to the stepper motor enables control of the rotational speed of the stepper motor and hence the time taken for the head to move between tracks on the disk. Thus the speed of response of the stepper motor and consequently the time taken for the read/write head to move from one track to another is a function of the pulse rate applied to the stepper motor.

One proposed way of controlling pulses to the stepper motor 1 is carried out using a drive circuit 2 (FIG. 1) which produces pulses in response to instructions received from a system drive controller or "host" 3, which may be, for example, a computer, or terminal or the like. Movement of the arm 4 is controlled by the stepper motor 1. The drive circuit 2 comprises hard-wired discrete circuit components.

The speed at which the stepper motor may be driven in response to an applied pulse rate is partly a function of the inertia of the combination of the motor and the load consisting of, for example, the stainless steel belt, thermal compensation mechanism (British patent application No. 8041323 corresponding to copending U.S. application Ser. No. 332,003 filed 12/18/81) spindles, arm and the read/write head. The inertia and torque specification of the motor determine the maximum acceleration and maximum deceleration of the motor. In the simplest implementation for an idealised system, the motor receives pulses to move the read/write head from one track 5 to another track 6 on the disk as shown in FIG. 2, there is a finite time and hence finite distance 7 over which the motor accelerates to maximum speed or slew speed 8, the value of the slew speed being dependent on the load and specification and dynamic characteristics of the motor. The slew speed is then maintained until a distance equivalent to the acceleration ramp distance 7 from the desired track 6 is reached. However, due to the inertia of the drive system, and as the system is open-loop, the motor and consequently the read/write head overshoots the desired track 6. The motor and read/write head then oscillates in a generally undamped way about the track 6 until the read/write head is in the correct position (FIG. 3). This overshooting or 'ringing' requires an additional finite time 9 for the read/write head to reach the correct position and this increases the access time for the read/write head to move from one track position to another on the disk. The issue of the step pulses may be implemented for example either by a discrete electronic circuit or by a microprocessor-based circuit. Although the use of the microprocessor gives certain advantages over discrete components, the 'ringing' or oscillation feature is still present when moving between tracks and is particularly evident and undesirable on reaching the desired track. This is a disadvantage of such proposed stepper motor control systems.

The idealised situation depicted in FIG. 2 shows that the stepper motor is exactly at rest at track 6. Of course this does not occur in practice. It is possible to consider modifying the deceleration ramp i.e. the rate of issue of pulses to bring the motor to rest at track 6. However, even this does not occur in practice due to inertia of the drive system and overshooting still occurs. In addition, overshoots across the tracks can be accumulated such that the drive is not synchronised to the operation of the system and the 'head' can lose its intended address.

Another way which has been proposed to control the overshooting is to use a technique called back-phase damping (BPD). In BPD, as the head is moved from the second last track to the last track, a pulse of the reverse phase is applied to the stepper motor to act as a braking mechanism and slow the speed of the motor and hence reduces the overshoot. The winding of the stepper motor corresponding to the last track is then energised to cause the stepper motor to move to the last track. This technique can be used with either the discrete component drive circuit or with the microprocessor controlled drive circuit. The time of starting and duration of the Back Phase Damping may vary with each winding of the stepper motor and may also vary between nominally similar stepper motors. Thus many different parameters need to be defined. However, the ringing or overshooting is often not satisfactorily reduced. In addition, rapidly pulsing the stepper motor to move in different directions on approaching an address causes a 'jerky' action and may lead to impairment of the motor response. These are disadvantages of such a proposed overshoot compensation technique.

In addition, in known stepper motor systems the acceleration and deceleration parts of the speed profile are usually represented by a linear ramp (FIG. 2). However, the inertial characteristics of a particular design of disk drive depend on components such as weight, preload friction and machining tolerances as well as the type of stepper motor used and consequently the acceleration and deceleration parts of the speed profile may be any one of a variety of shapes 10a, 10b such as exponential, sigmoid etc. depending on the inertial characteristics of the particular drive unit design and the specification of the selected stepper motor (FIG. 4).

During control of the stepper motor drive it is essential to know the torque/speed characteristics of the motor exactly so that the pulse rate applied to the stepper motor is correctly modified to reduce the time taken to move between tracks. That is, the movement of the read/write head is optimised to reach the desired track in the minimum time. If the pulse rate from the control circuit is not matched to the particular toque/speed profile, then the speed of the motor may be too slow and consequently the access time is not minimised or, if the pulse rate is too high the motor may stall with loss of synchronisation. With hard-wired circuits composed of discrete components, it is relatively difficult to match the pulse rate closely to the motor torque/speed characteristic of a particular stepper motor. With a previously proposed microprocessor controlled drive circuit, the circuit is not suitable for use with motors having non-linear speed/time characteristics thus its usefullness is limited in practice as many motors have non-linear characteristics.

A further disadvantage of conventional stepper motor control systems is absence of method for satisfactorily removing angular errors associated with mechanical and magnetic hysteresis in the stepper motor. In a disk drive this can lead to positioning inaccuracy of the read/write head on the desired track when that track is approached from different directions. There are further disadvantages of such proposed stepper motor control circuits.

SUMMARY OF THE INVENTION

An object of the present invention is to mitigate or obviate the abovesaid disadvantages of known stepper motor control circuits and to mitigate or obviate the disadvantages of overshoot compensation systems.

The present invention solves the problem of compensating for overshooting of the desired track by providing a microprocessor-based circuit adapted to drive the stepper motor in accordance with a predetermined programme. The microprocessor effectively damps the oscillation of the stepper motor by controlling the current supplied to the motor during the last step of its motion. This current is controlled by switching it during small predetermined time intervals. Thus the overshooting is minimised and the response of the motor to the drive circuit is optimised for accurate tracking. The present invention also solves the problem of providing a non-linear pulse rate to match the torque/speed characteristic of the stepper motor selected for the disk drive. The pulse rate is determined by data held in the memory of the microprocessor circuit and this data can be modified to suit the requirements of the stepper motor and load. This results in a particular pulse rate being applied to the stepper motor to minimise the time taken to access information for any particular instruction.

Further the present invention solves the problem of hysteresis by ensuring that each track on the disk is approached from the same direction and from the same set of previously energised windings. The microprocessor controls the direction of motion of the stepper motor and hence decides whether or not the read/write head should cross the desired track and return to it to ensure uniformity of approach. This results in an improved positioning accuracy of the read/write head on the desired track.

According to a first aspect of the present invention there is provided a method of minimising the tracking overshoots in an open-loop disk drive having a signal processing means, programmable memory means connected to the signal processing means, said signal processing means having an output connected to the stepper motor, and an input connected to a controller for use with the disk drive, the programmable memory means including a program for controlling the movement of the stepper motor from one track to another, said method comprising the steps of dividing the duration of at least one current pulse period applied to the stepper motor into a predetermined number of pulse elements, applying a finite amount of current to a winding of said stepper motor in said at least one pulse element, said finite amount of current being determined by the net ratio of the time for which current is applied to the winding of the stepper motor to the time for which no current is applied to that winding during said pulse element, 'and varying the ratio of current-on time to current-off time in each pulse element whereby the magnitude of current in the pulse period is determined by the net current in each pulse element and is applied to the winding of the stepper motor in a predetermined manner over the duration of the pulse.

Preferably, the method is applied to the last pulse before the desired track to be reached.

Preferably also, the pulse elements are of equal duration.

Preferably also, the period of time during which current is switched on in each pulse element duration is variable, and preselectable depending on the characteristics of the stepper motor.

According to a second aspect of the present invention there is provided a method of minimising the time taken to move a stepper motor between two angular positions, corresponding to tracks on a disk surface, comprising, determining the torque speed characteristics for a particular stepper motor, storing the data corresponding to said characteristics in a program, in accordance with said program accelerating the stepper motor for a first predetermined period to a predetermined speed, maintaining the predetermined speed substantially constant over a second predetermined period, at the end of said second predetermined period decelerating said stepper motor over a third predetermined period, matching a rate of pulses applied to the stepper motor to the torque speed characteristics during each period of the movement whereby the stepper motor is moved between two angular positions in a minimum time for said particular torque speed characteristic.

Preferably, the speed of the stepper motor is a maximum after the stepper motor has moved an amount corresponding to a predetermined number of tracks on the disk surface being crossed.

Preferably also the first predetermined period and the third predetermined period are of substantially equal duration.

According to a third aspect of the present invention there is provided a method of compensating for variable magnetic and mechanical hysteresis when moving between tracks comprising the steps of, recording address of the desired track to be attained, crossing the desired track address by a predetermined amount in one direction, returning to the desired track in the reverse direction, so that each track is approached from the reverse direction independent of the original location of the stepper motor and said mechanical and magnetic hysteresis being therefore constant for each respective track.

According to a fourth aspect of the present invention there is provided apparatus for minimising the tracking errors and oscillations for a single step in an open-loop disk drive, said apparatus comprising, signal processing means, programmable memory means connected to the signal processing means, said signal processing means having an output connected to the stepper motor, and an input connectable to a controller for use with a disk-drive, said programmable memory means including a program for controlling the movement of the stepper motor, whereby in use said signal processing means divides the last pulse into a predetermined number of pulse elements in accordance with the program and the ambient position of the stepper motor, and applies a finite amount of current to a winding of the stepper motor in at least one pulse element duration, so that the magnitude of the current pulse is spread over the entire duration of the pulse and the stepper motor is moved between tracks in accordance with the finite amounts of current applied thereto.

Preferably said signal processing means and said programmable memory means are combined in a microprocessor.

Preferably also, the microprocessor is an 8-bit device, and the programmable memory is a 1 kilobyte erasable programmable read-only memory (EPROM).

According to a fifth aspect of the present invention there is provided a drive circuit for controlling the movement of a stepper motor comprising a signal processing means, a programmable memory means connected to the signal processing means, said signal processing means having an input connected to the output of a controller, and an output connected to the stepper motor, said programmable memory means having a program corresponding to the torque/speed characteristics of the stepper motor stored therein, said signal processing means executing said program in response to instructions from the controller and instructing said signal processing means to match the rate of pulses applied to the stepper motor to the disk speed characteristics during the movement of the stepper motor whereby the stepper motor is moved between two angular positions in a minimum time for the particular disk speed characteristic.

Preferably, said signal processing means and said programmable memory means are combined in a microprocessor.

BRIEF DESCRIPTION OF THE DRAWINGS

Embodiments of the present invention will now be described by way of example with reference to the accompanying drawings in which:

FIG. 7b is a waveform showing the mark to space ratios of the pulse elements of FIG. 7a;

DETAILED DESCRIPTION OF PREFERRED EMBODIMENTS

Figure 1:
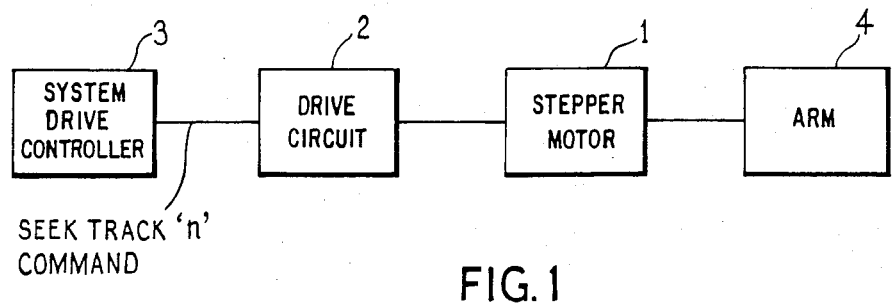
FIG. 1 is a block diagram of a conventional stepper motor control circuit.
Figure 2:
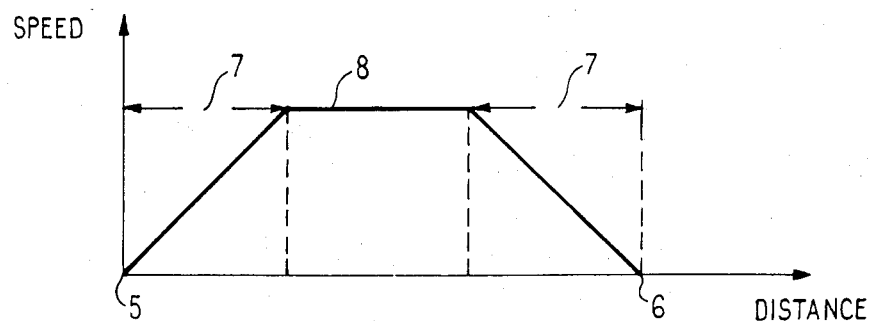
FIG. 2 is a velocity profile of a conventional stepper motor disk drive.
Figure 3:
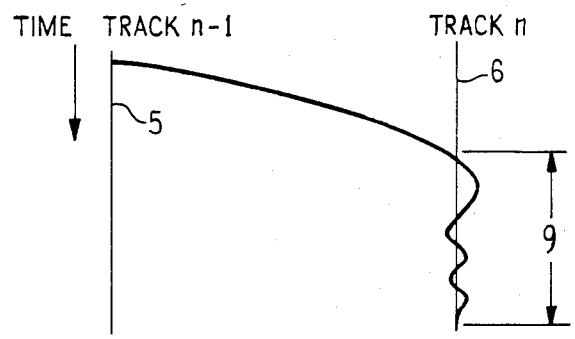
FIG. 3 is a schematic diagram of the action of the read/write head locating the desired track for the conventional velocity profile shown in FIG. 2 without overshoot compensation.
Figure 4:
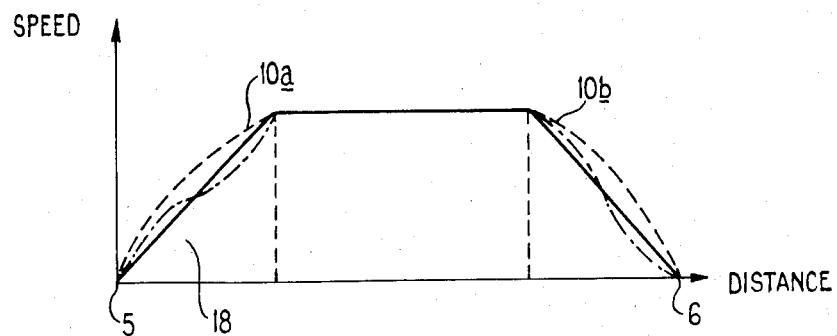
FIG. 4 is a typical velocity profile of a stepper motor showing different accelerating and decelerating velocity profiles.
Figure 5:
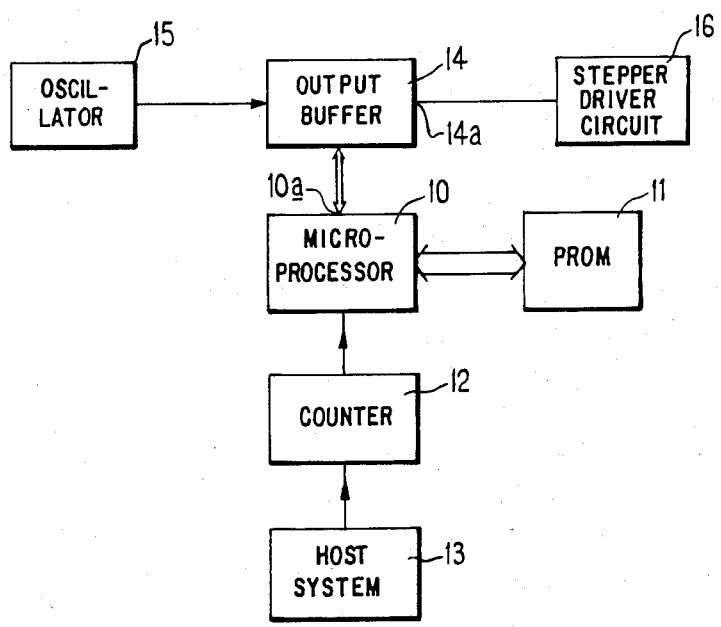
FIG. 5 is a block diagram of the apparatus according to the third and fourth aspects of the present invention.

Referring now to FIG. 5 of the drawings, an INTEL 8748 microprocessor (MPU) 10 includes a programmable read/only memory (PROM) 11. The PROM 11 contains a set of instructions in program format which are stored therein. A first sub-program (FIG. 14) contains information relating to the overshoot compensation of the stepper motor at the desired address track, a second sub-programme (FIG. 13) contains information relating to the velocity profile (FIG. 2, FIG. 4) of the stepper motor and a third sub-program (FIG. 15) contains information relating to the positioning of the stepper motor to each desired track to compensate for variable magnetic and mechanical hysteresis.

The MPU 10 is connected to an inernal input-counter 12 which in turn is connected to a host system 13. The host system 13 may be any system associated with computer disk drives and may be, for example, a word processor, a desk top computer, or a business accounting system. The output 10a of the MPU 10 is connected to an output buffer 14 internal to the MPU 10 the output 14a of which in turn is connected to the stepper motor drive circuit 16. An oscillator 15 is also connected to the MPU 10. The stepper motor position is controlled by the MPU 10.

Having determined the optimum pulse rate for the acceleration and deceleration ramps of the speed/torque characteristics of the stepper motor and load, a constraint is placed on the rate at which pulses are required to be sent from the host system 13 to the MPU 10. This constraint takes the form of an allowed range of pulse rates e.g. 10 $\mu$s–200 $\mu$s/pulse. The MPU 10 senses the pulse rate and if it lies within the allowed range the MPU 10 executes said second sub-program to control acceleration and deceleration of the stepper motor according to the predetermined velocity ramps.

When in use, a sequence of step commands corresponding to the number of tracks is entered from the host system 13 into the counter 12 of MPU 10. The data may be fed in parallel or in serial form into the counter 12. A typical number of tracks to be crossed may be 50 and this number is then entered serially into the MPU 10. When MPU 10 confirms the pulse rate is within the permitted range it signals the memory to provide a set of instructions for issuing the pulses which will enable the stepper motor to move to the desired track address in the minimum time, according to the velocity profile corresponding to a 50 track seek. Execution of the set of instructions from program information in the PROM 11 (the second sub-program referred to above) results in the MPU 10 issuing to the stepper driver circuit 16 a series of pulses whose frequency varies non-linearly from 1.2 msecs/pulse to 0.55 msec/pulse over the acceleration phase 18 (FIG. 4). The acceleration phase may cover up to 12 tracks. When the 12th track is reached the program sub-instructs the MPU 10 to maintain the pulse frequency at 1 pulse/0.55 ms. The stepper motor 16 is now moving at a speed which is consistent with the motor not stalling. This pulse rate is chosen to match the torque/speed characteristics of the stepper motor. That is, in order to minimise time taken between tracks, the stepper motor drive circuit 16 is usually driven at the maximum speed which is consistent with it not stalling. When the motor reaches a predetermined number of tracks from the desired track, in this case 12, the sub-program instructs the MPU 10 to effect the deceleration ramp 16. The pulse frequency is gradually decreased from 1 pulse every 0.55 ms. down to zero at the desired track.

Figure 13:
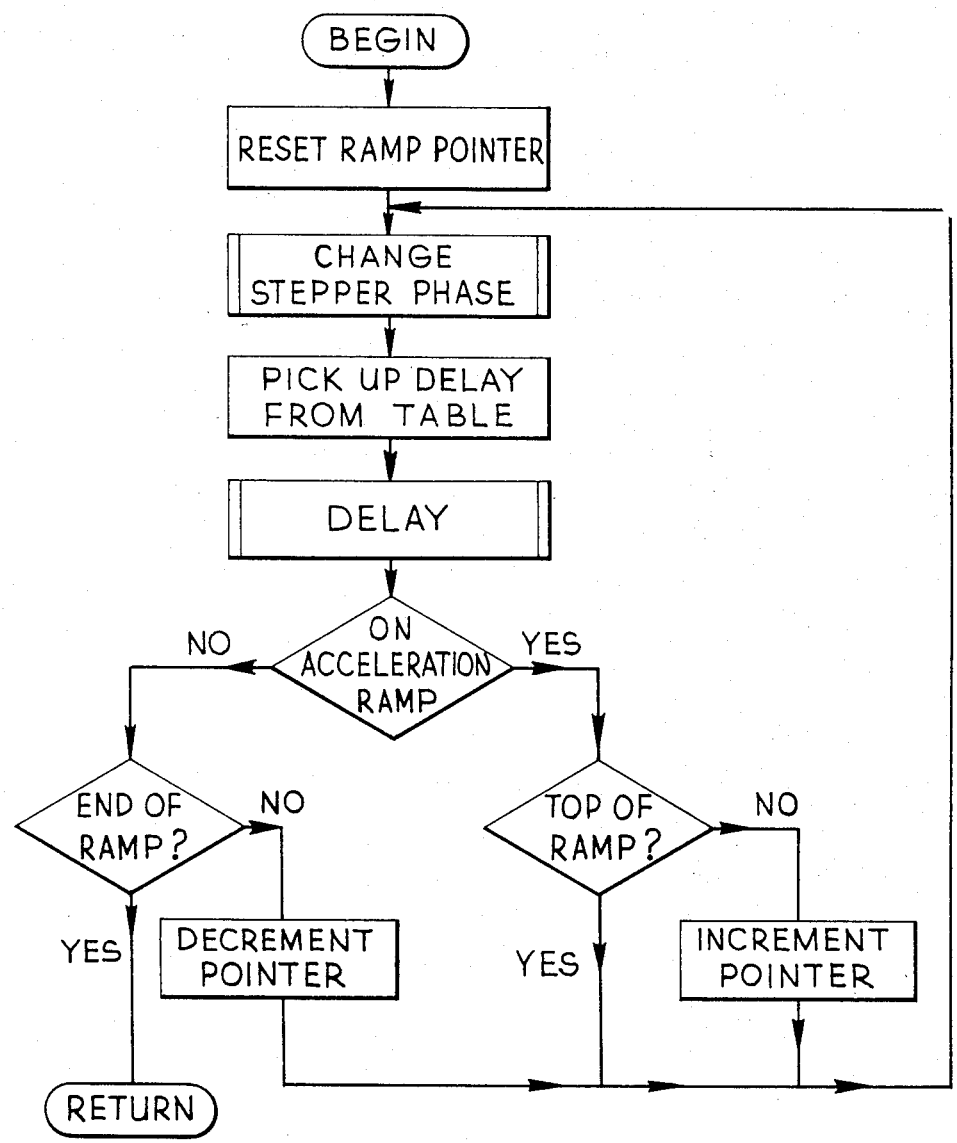
FIG. 13 is a flow chart of a program relating to the velocity of a stepper motor.

FIG. 13 illustrates the organization of one suitable form for this sub-program. The velocity profile for a given inter-track movement is stored in the form of a table of delay times between successive stepper motor pulses. The appropriate delay is picked up from the table and at the end of this delay the next stepper motor pulse is issued from the control circuit. FIG. 13 assumes a symmetrical velocity profile, which allows the deceleration ramp to be dealt with by decrementing on the same table.

Figure 6:
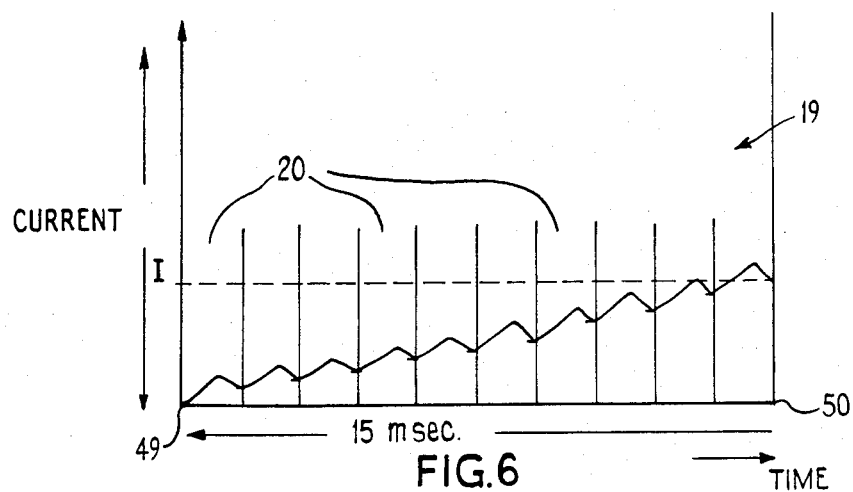
FIG. 6 is a schematic diagram of a current pulse period divided into pulse elements of equal duration.
Figure 7A:
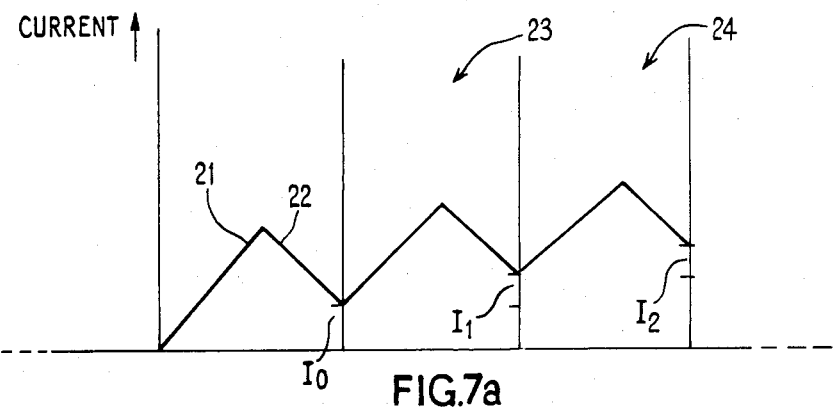
FIG. 7a is an expanded view of one pulse element of FIG. 6.
Figure 7B:
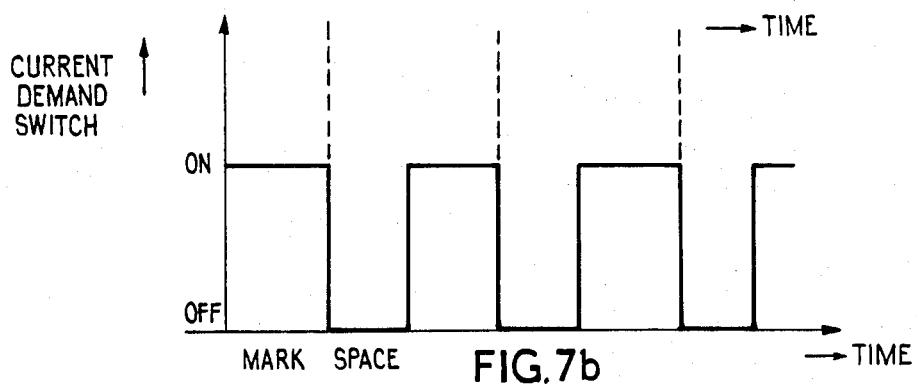
Figure 9:
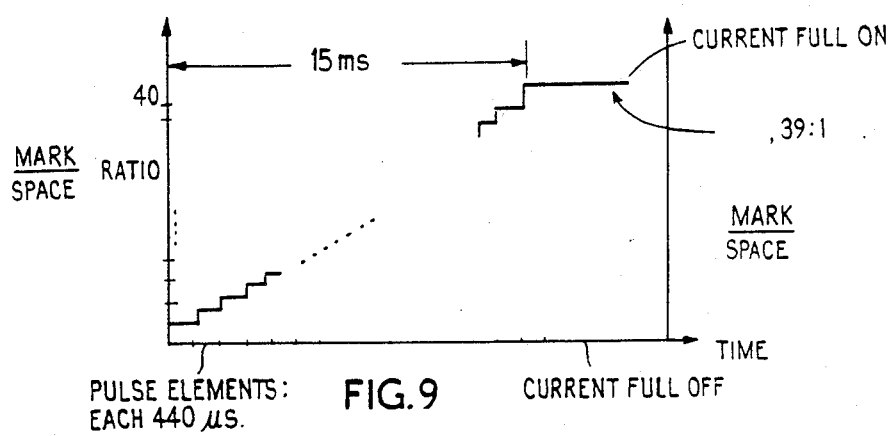
FIG. 9 is a schematic diagram of the ratio of current applied to no current applied to the stepper motor for the last step from one track to another.
Figure 8:
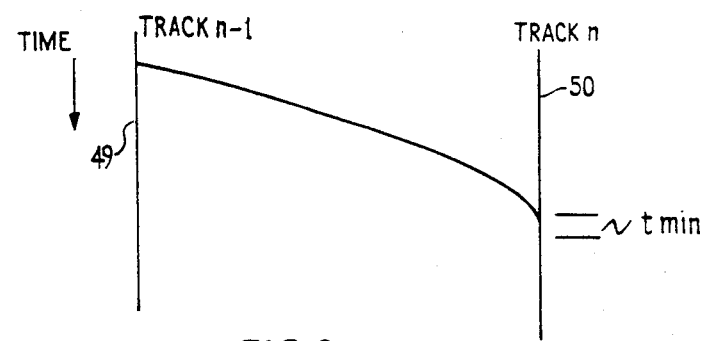
FIG. 8 is a schematic diagram similar to FIG. 3 of a stepper motor response with overshoot compensation in accordance with the present invention.

The stepper motor velocity should be zero at the desired track. However, as mentioned before, this will not be the case, due to inertia of the motor and load, and the read/write head will overshoot and oscillate about the desired track increasing the time for the read/write head to access the desired track address. Therefore, when the stepper motor drive circuit 16 reaches the second last track, another set of program information in the PROM 11 (the first sub-program referred to above) is executed by the MPU. This sub-program contains data which enables the overshoot at the desired track to be compensated. When the second last track 49 is reached the MPU 10 executes this sub-program. The energisation of current into the windings corresponding to the desired track 50 is divided into a predetermined number of pulse elements 20, the duration of each pulse element 20 being identical at 440 μs. (FIG. 6). Note that this duration could be any convenient length consistent with the MPU 10. The total duration of pulse elements is 15 ms after which time the current corresponding to the winding of the desired track remains constant (FIGS. 6, 9). The amount of current passed to the stepper motor in each pulse element 20 is determined by the ratio of time for current on 21 to time for current off 22 and is denoted as (I(on)/I(off)) and is called the mark to space ratio (FIG. 7b). The mark to space ratio for each element is selected so that there is a small net increment of current $I_o$ (FIG. 7a) due to electrical time constants especially winding induction of the stepper motor and this accumulates at $I_1$, $I_2$ with subsequent elements 23, 24 respectively so that the full magnitude of a current pulse is gradually applied over the 15 ms. period of time (FIG. 6). This, in effect is the result of the stepper motor receiving a number of minor steps which have a relatively high frequency in comparison with the basic step rate. Thus, the net current is applied to the stepper motor in a controlled way and the result is to cause the stepper motor, and consequently the read/write head to approach the desired track 50 as shown in FIG. 8 overshooting and oscillation being greatly reduced and the access time is therefore minimised, giving better disc-drive performance. The sequence of the mark/space ratios and the number of pulse elements is optimised to give minimum time to settle. The value of mark to space for each pulse element is determined from a "look-up" table held in PROM 11, the entries in the table being used to set loop or cycle times in the program of the MPU 10 thus determining how long current will be switched in a winding during the pulse element 20.

The current is applied to each pulse element for a period defined by the mark to space ratio as aforedescribed. In a pulse element 440 μs. long the theoretical maximum mark to space ratio for switching time increments of 10 μs., a typical maximum for MPU 10, would be 43:1 and the theoretical minimum would be 1:43. In fact the practical maximum and minimum ratios used are 39:1 and 1:39 corresponding closest to current full on and current full off respectively (FIG. 9). When the current is applied to the stepper motor during the last step the motor is driven in accordance with these minor pulses and the result is a net current change as shown in FIG. 6. The mark to space ratio can be varied considerably to suit the requirements of a particular stepper motor.

Figure 14:
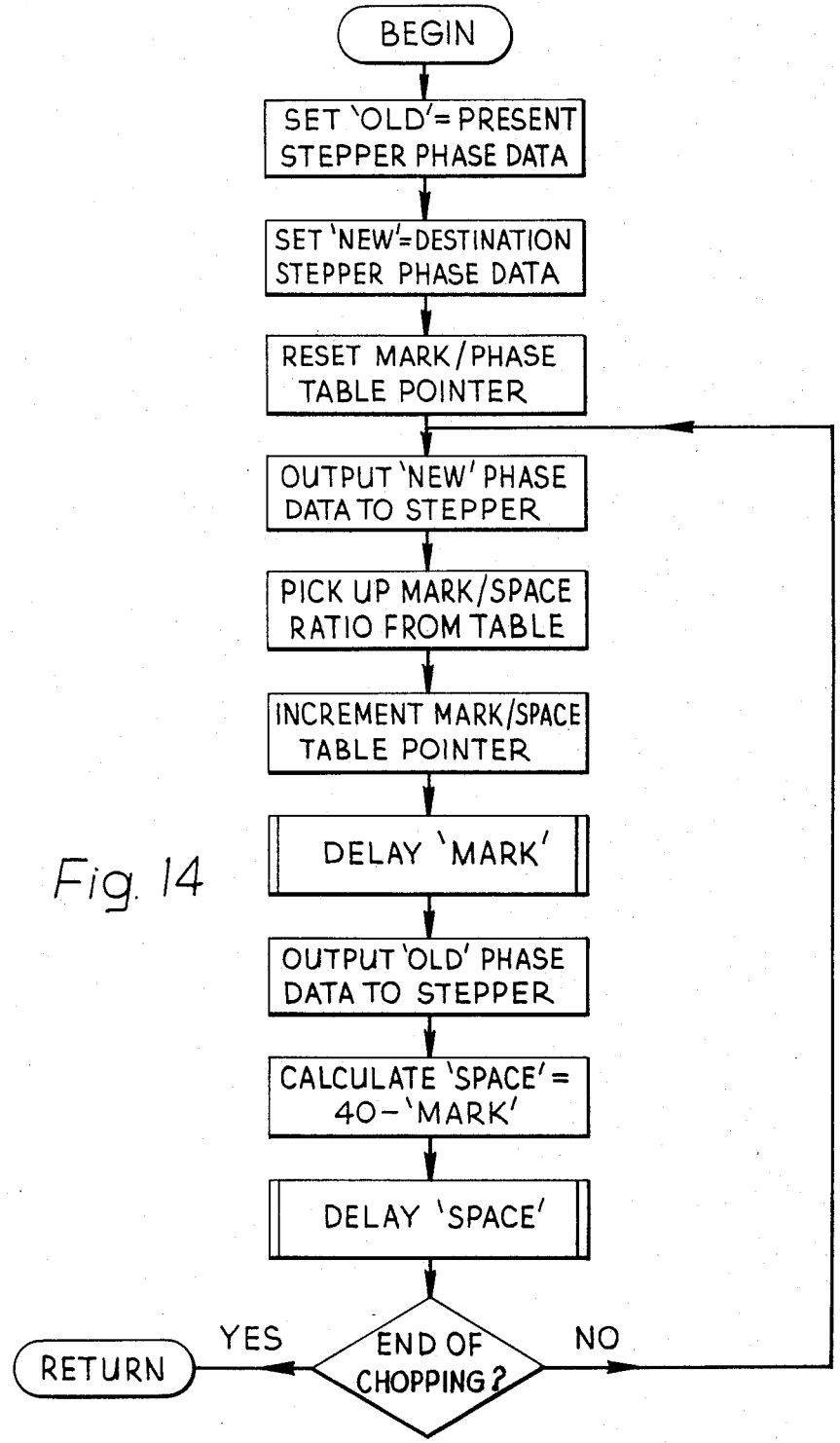
FIG. 14 is a flow chart of a program relating to overshoot compensation of a stepper motor at a desired address track.

FIG. 14 illustrates one routine for carrying out this sub-program using a look-up table and a mark:space ratio in the range of 39:1 to 1:39.

Figure 10A:
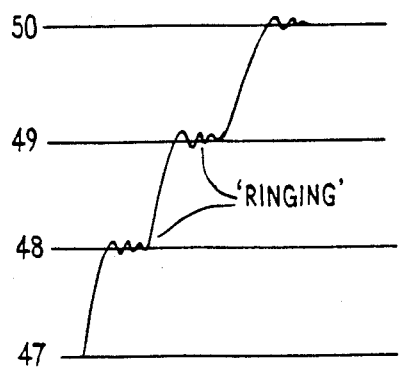
FIGS. 10a and 10b are schematic diagrams of the stepper motor stepping across tracks with the compensation method not applied, and then applied respectively.
Figure 10B:
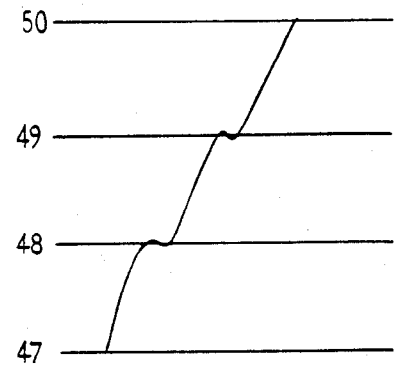

Pulse elements may also be applied to the stepper motor at any time during the movement of the stepper motor from one track to another. The effect of using such 'intermediate' pulse elements is to reduce the amount of overshooting between tracks as comparatively shown in FIGS. 10a and 10b in a 'non-ramp' or constant mode of stepping. This results in a minimisation of 'ringing' in the last step and helps to minimise the time taken for the stepper motor to be located at the desired track. For a constant mode of stepping of 3 ms. per step pulse, there would be seven pulse elements each of 440 μs. duration.

There are several special conditions which may occur and all are within the scope of the invention. For example, if the required number of tracks to be crossed is less than or equal to 24, i.e. where only short movement is required, the MPU 10 sends instructions from the PROM 11 to the stepper motor drive circuit 16 to accelerate, but not to maximum speed, and then decelerate to zero. Thus the pulse rate and hence the speed only reaches a maximum when at least 24 tracks require to be crossed. When the number of steps is greater than, or equal to, 5, that is, the MPU 10 will use the ramp program, the pulse element technique is used only for the last step. All other steps are regular stepper motor steps.

Figure 11:
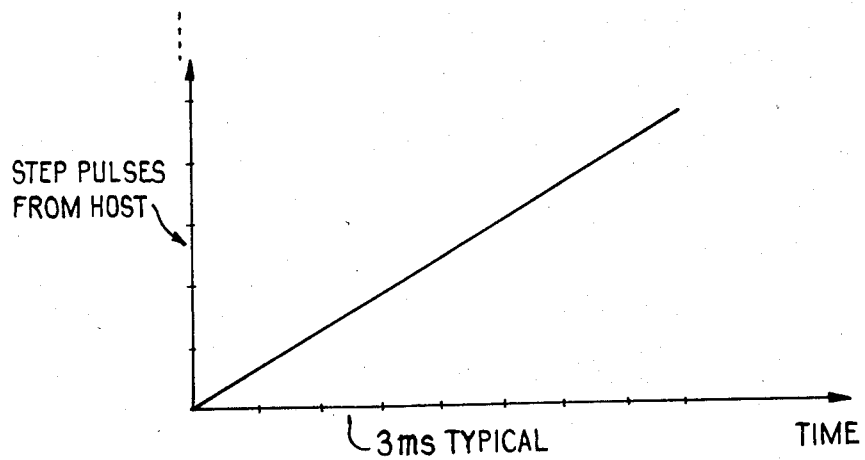
FIG. 11 is a graph showing the relationship between step pulses from the host and time when in a non-ramp mode.

In addition, the situation arises where the disk-drive may be connected to host systems which are unable to supply step pulses to the MPU 10 within the allowed range for ramp action. In this case, the host will generally issue pulses at regular intervals (as shown in FIG. 11) with the result that the stepper motor, and consequently the read/write head is moved between tracks at a substantially constant speed. The pulse element technique may be applied to these steps.

Figure 12:
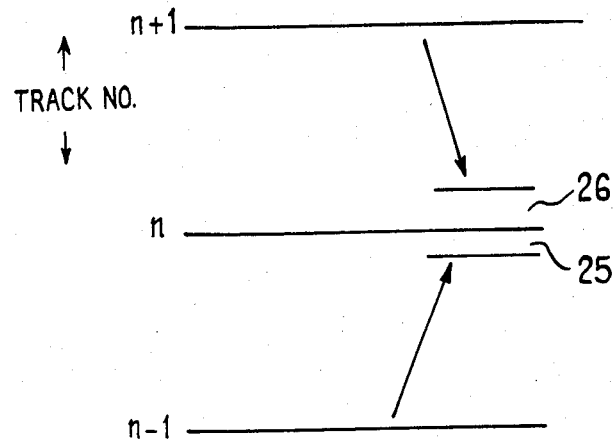
FIG. 12 is a schematic diagram illustrating how the stepper motor approaches the desired track from the same direction to provide a constant value of hysteresis.

The circuit of FIG. 5 is also used to compensate for magnetic and mechanical hysteresis which is present at each track. This hysteresis results in a positional error of the read/write head when a track is approached from either direction and this can lead to impaired signal to noise (S/N) ratios. When the host system gives an instruction to seek track 'n', the MPU 10 is informed of the direction in which the stepper motor has to move. With reference to FIG. 12, for example if the stepper motor moves from track n−1 to track n the movement is carried out as described before. Thus a positioning error in this direction, 25, is present. If the motor approaches the desired track n from track n+1, a positioning error 26 is present in this direction. Hysteresis refers to the total error 25 plus 26.

When the motor approaches track n from track n+1 the program (the third sub-program referred to above) causes the MPU to provide two additional pulses so that the stepper motor moves from track n+1→n→n−1→n. Thus the stepper motor approaches track n in the same direction and hence the hysteresis is largely eliminated resulting in reduced positioning error and improved disk-drive performance. The steps of n+1 to n, and n to n−1 are treated by the drive circuit with intermediate pulse elements and the last step n−1 to n is subject to the full pulse element treatment. It is not necessary to fully reach track n−1 to achieve a satisfactory reduction of hysteresis.

Figure 15:
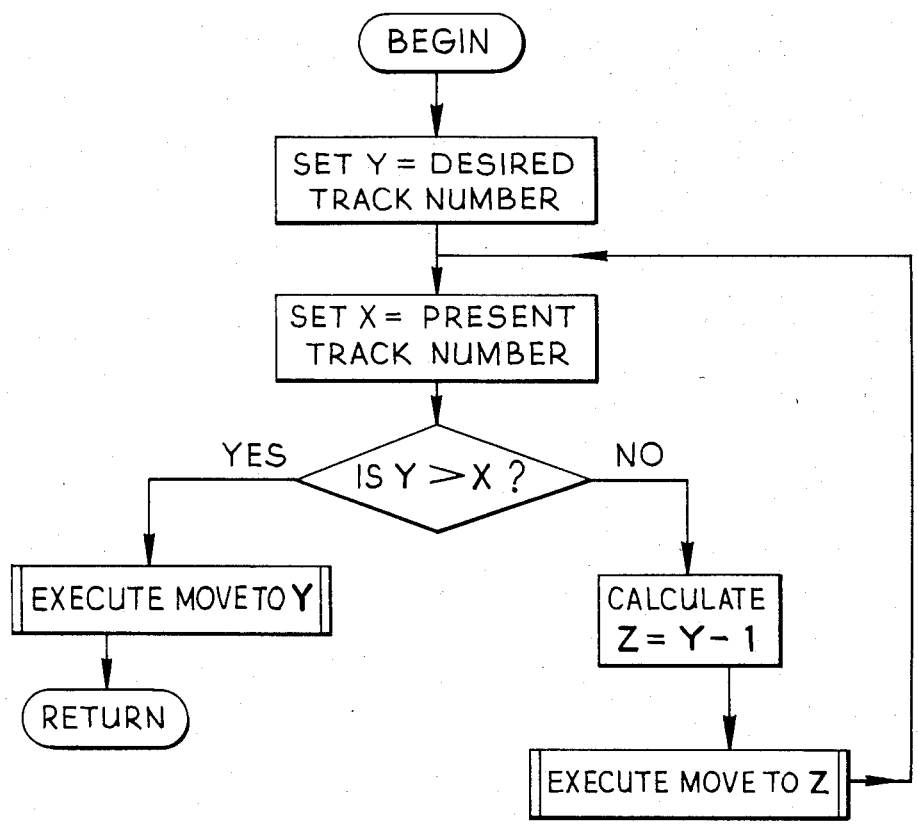
FIG. 15 is a flow chart of a program relating to the positioning of a stepper motor to each desired track to compensate for variable magnetic and mechanical hystersis.

FIG. 15 illustrates one routine for carrying out this sub-program.

Without departing from the scope of the invention it should be understood that several circuits exist for supplying current to the stepper motor windings under the instruction of the MPU 10. For example the invention disclosed herein may equally well be effected using circuits which supply current from unipolar or bipolar power supplies or from constant voltage or constant current sources. One preferred implementation is the constant current source wherein current of amounts which are largely independent of voltage and temperature variations can be switched into the stepper motor under the control of the MPU 10 as previously described. An advantage of the constant current source is apparent when the stepper motor is used in the half-step mode; normally the half-step consists of one winding being energised compared to 2 for the full-step and generally therefore provides half the torque. It is relatively straightforward with a constant current source to increase current in the half-step thereby tending to equalise torque when the motor is used in both full and half-step modes. This tends to also equalise the choices of mark to space ratios when the desired track corresponds to a half-step or a full-step simplifying the implementation of the program in MPU 10 as previously discussed.

The circuitry hereinbefore described may operate on NMOS (negative-metal-oxide-semiconductor), CMOS (complementary-metal-oxide semiconductor), bipolar or any other suitable semiconductor technology. It is considered a straightforward modification of this circuit to integrate all the circuits using contemporary large scale integration (LSI) techniques. Similarly, the invention may be used with different classes of stepper motor including hybrid, permanent magnet and variable reluctance.

Thus this invention is particularly advantageous where the inertia of the motor and attached components result in a non-linear velocity profile, and the information stored in the programmable memory enables the stepper motor to be pulsed at a variable frequency such that the read/write head is moved from one track to another in a minimum time; the information enables the stepper motor to be micro stepped to provide overshoot compensation at the desired track and also at intermediate tracks; and also the variable hysteresis of each track is eliminated.

In addition, the use of a microprocessor provides greater flexibility and control than would have been otherwise possible with discrete elements, and also considerably reduces the cost of a stepper motor drive circuit, and the time taken to produce the circuit.

Thus there is provided a method of, and apparatus for, controlling a stepper motor which provides improved disk-drive performance.

We claim:

1. A method of minimising the tracking overshoots in an open loop disk device having a signal processing means, programmable memory means connected to the signal processing means, said signal processing means having an output connected to the stepper motor, and an input connected to a controller for use with the disk drive, the programmable memory means including a program for controlling the movement of the stepper motor from one track to another,
    said method comprising the steps of dividing the duration of a least one current pulse period applied to the stepper motor into a predetermined number of pulse elements,
    applying a finite amount of current to a winding of said stepper motor in said at least one pulse element, said finite amount of current being determined by the net ratio of the time for which current is applied to the winding of the stepper motor to the time for which no current is applied to that winding during said pulse element,
    and varying the ratio of current-on time to current-off time in each pulse element whereby the magnitude of current in the pulse period is determined by the net current in each pulse element and is applied to the winding of the stepper motor in a predetermined manner over the duration of the pulse.

2. A method as claimed in claim 1 characterised in that said method is applied to the last pulse before the desired track is reached.

3. A method as claimed in claim 2 characterised in that said pulse elements are of equal duration.

4. A method as claimed in claim 3 characterised in that the period of time during which current is switched on in each pulse element duration is variable, and preselectable depending on the characteristics of the stepper motor.

5. A method as claimed in claim 4 characterised in that the time when current is switched on to the time when current is switched off is variable from 39:1 maximum to 1:39 minimum respectively.

6. A method as claimed in claim 1 characterised in that said method is operated in accordance with a program stored in said programmable memory means.

7. A method as claimed in claim 6 characterised in that said method is executed in accordance with instructions from said signal processing means, controlling the operation of the program in the programmable memory means.

8. A method as claimed in claim 1 characterised in that the controller is any host system to which the circuit is connected.

9. A method as claimed in claim 1 characterised in that the time taken for locating the stepper motor from the penultimate to the last track is less than 15 milliseconds.

10. A method of minimising the time taken to move a stepper motor between two angular positions, corresponding to tracks on a disk surface, comprising,
determining the torque speed characteristics for a particular stepper motor,
storing the data corresponding to said characteristics in a program,
in accordance with said program accelerating the stepper motor for a first predetermined period to a predetermined speed,
maintaining the predetermined speed substantially constant over a second predetermined period,
at the end of said second predetermined period decelerating said stepper motor over a third predetermined period,
matching a rate of pulses applied to the stepper motor to the torque speed characteristics during each period of the movement whereby the stepper motor is moved between two angular positions in a minimum time for said particular torque speed characteristic.

11. A method as claimed in claim 10 characterised in that the speed of the stepper motor in said second predetermined period is a maximum after the stepper motor has moved an amount corresponding to a predetermined number of tracks on the disk surface being crossed.

12. A method as claimed in claim 10 characterised in that the first predetermined period and the second predetermined period are of substantially equal duration.

13. A method as claimed in claim 10 characterized in that the deceleration step in the third predetermined period, in order to minimise tracking overshoots, comprises:
the steps of dividing the duration of at least one current pulse period applied to the stepper motor into a predetermined number of pulse elements,
appyling a finite amount of current to a winding of said stepper motor in said at least one pulse element, said finite amount of current being determined by the net ratio of the time for which current is applied to the winding of the stepper motor to the time for which no current is applied to that winding during said pulse element,
and varying the ratio of current-on time to current-off time in each pulse element whereby the magnitude of current in the pulse period is determined by the net current in each pulse element and is applied to the winding of the stepper motor in a predetermined manner over the duration of the pulse.

14. A method as claimed in claim 10 wherein the duration of the current pulse when accelerating the stepper motor is different from the current pulse when decelerating the stepper motor.

15. A method for compensating for variable magnetic and mechanical hysteresis when moving between tracks comprising the steps of:
recording the address of a desired track to be attained,
comparing the desired address with the present address to determine the direction of movement required,
if said direction is in one sense, effecting movement direct to the desired track,
if said direction is in the other sense, effecting movement by crossing the desired track address by a predetermined amount in one direction, and returning to the desired track in the reverse direction, so that each track is approached from the reverse direction independent of the original location of the stepper motor and said mechanical and magnetic hysteresis being therefore constant for each respective track.

16. A method as claimed in claim 15 characterised in that the predetermined amount is less than a track width.

17. Apparatus for minimising the tracking errors and oscillations in a single step in an open-loop disk drive, said apparatus comprising, signal processing means, programmable memory means connected to the signal processing means, said signal processing means having an output connected to the stepper motor, and an input connectable to a controller for use with a disk-drive, said programmable memory means including a program for controlling the movement of the stepper motor, whereby in use said signal processing means divides the last pulse into a predetermined number of pulse elements in accordance with the program and the ambient position of the stepper motor, and applies a finite amount of current to a winding of the stepper motor in at least one pulse element duration, so that the magnitude of the current pulse is spread over the entire duration of the pulse and the stepper motor is moved between tracks in accordance with the finite amounts of current applied thereto.

18. Apparatus as claimed in claim 17 characterised in that said signal processing means and said programmable memory means are combined in a microprocessor.

19. Apparatus as claimed in claim 18 characterised in that the microprocessor is an 8-bit device, and the programmable memory is a 1 kilobyte erasable programmable read-only memory (EPROM).

20. A drive circuit for controlling the movement of a stepper motor comprising a signal processing means, a programmable memory means connected to the signal processing means, said signal processing means having an input connected to the output of a controller, and an output connected to the stepper motor, said programmable memory means having a program corresponding to the torque/speed characteristics of the stepper motor stored therein, said signal processing means executing said program in response to instructions from the controller and instructing said signal processing means to match the rate of pulses applied to the stepper motor to the disk speed characteristics during the movement of the stepper motor whereby the stepper motor is moved between two angular positions in a minimum time for the particular disk speed characteristic.

21. A drive circuit as claimed in claim 20 characterised in that said signal processing means and said programmable memory means are combined in a microprocessor.

22. A drive circuit as claimed in claim 20, wherein the controller is any host system to which the current is connected.

* * * * *